June 22, 1965 W. J. RAEHS ET AL Re. 25,807

AEROSOL VALVE

Original Filed Jan. 7, 1958

INVENTORS:
WILHELM J. RAEHS & HANS RAUCHMANN
BY
Burgess, Dinklage & Sprung
ATTORNEYS United States Patent Office Re. 25,807
Reissued June 22, 1965

25,807
AEROSOL VALVE

Wilhelm Josef Raehs and Hans Rauchmann, Stolberg, Rhineland, Germany, by Consilia Fiduciaire, assignee Original No. 2,949,243, dated Aug. 16, 1960, Ser. No. 707,622, Jan. 7, 1958. Application for reissue May 13, 1963, Ser. No. 284,771
Claims priority, application Germany, Jan. 8, 1957
3 Claims. (Cl. 239—579)

Matter enclosed in heavy brackets [ ] appears in the original patent but forms no part of this reissue specification; matter printed in italics indicates the additions made by reissue.

This invention relates to a new and improved valve for use with aerosol containers and cans.

The marketing of various products in cans or containers under pressure with a propellant gas such as an inert gas so that the same may be automatically discharged in a pressurized spray or stream has become widespread.

The so called aerosol containers for these products are generally provided with a valve which is biased closed by a spring, and forced open by manual operation, as for example, by finger pressure. Due to the required dimensions for the valve, and in particular, the valve body and valve seat, the pressure acting on the valve, i.e., the pressure of the propellant gases of the aerosol product are not sufficient to force and maintain the valve closed and in all cases, the spring is absolutely necessary to effect the closing actuation and to maintain the valve sealed. Furthermore, in the conventional aerosol valve, the distance from the valve seal to the outlet opening of the container is relatively long which may interfere with the quality of the spray produced.

One object of this invention is a novel aerosol valve construction which may solely rely on the pressure of the propellant for the closing and sealing actuation.

A further object of this invention is an aerosol valve which may be manufactured much more cheaply than the conventional aerosol valve.

A still further object of this invention is an aerosol valve in which the path from the valve seal to the outlet opening is relatively small, whereby a good spray effect is obtained.

Figure 1:
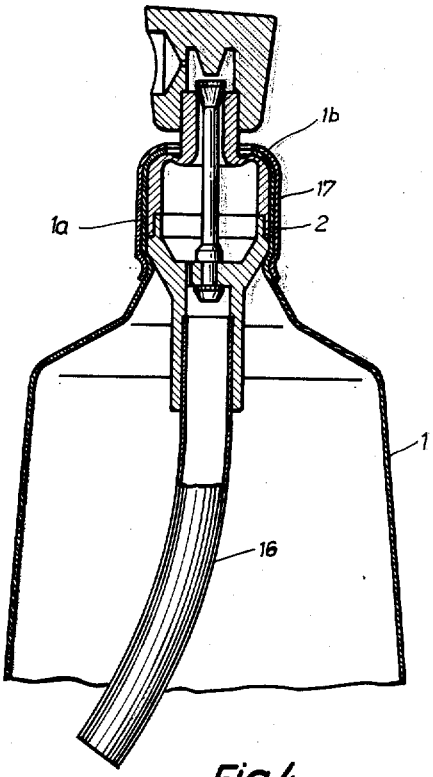
Figure 2:
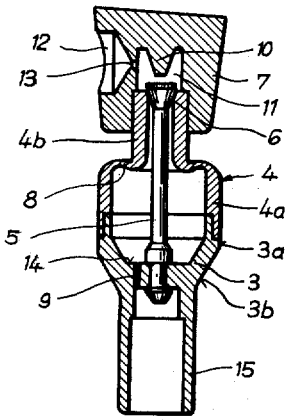
Figure 3:
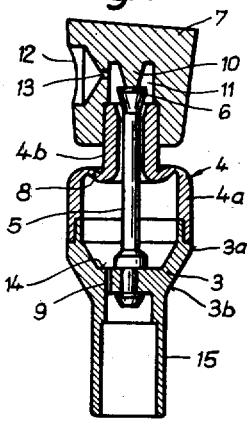
Figure 4:
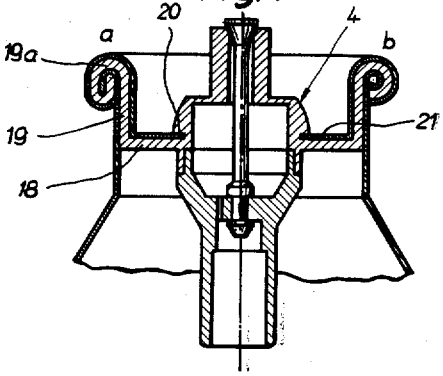

These, and still further objects will become apparent from the following description read in conjunction with the drawings, in which:

FIG. 1 is a vertical section of an embodiment of an aerosol valve, in accordance with the invention, positioned in place on an aerosol container, the container being partially shown, FIG. 2 is a vertical section of the valve shown in FIG. 1 in its closed position, FIG. 3 is a vertical section of the valve shown in FIG. 1 in open position, and FIG. 4 is a vertical section of a further embodiment of an aerosol valve, in accordance with the invention, positioned in place on an aerosol container neck.

The aerosol valve, in accordance with the invention, comprises a stationary valve body, a movable valve seat, which is positioned for sealing engagement with the valve body and which may be manually actuated out of sealing engagement with the valve body and a movable diaphragm connected to the valve seat and positioned to be acted on by the pressure in an aerosol container to which the valve is attached to resiliently force the valve seat in sealing engagement with the valve body.

The valve, preferably is in the form of a hollow body, having a resilient wall portion defining a diaphragm, with a valve seat connected thereto as, for example, defined on a neck, forming an extension of the body. An outlet passage is defined from the interior of the hollow body through the valve seat and a valve body, such as a valve cone is positioned on a valve stem extending through the hollow body for sealing engagement with the valve seat. In operation, the valve seat may be manually moved out of sealing engagement with the valve body against the fluid pressure in the interior of said hollow body, as for example, by finger pressure applied to a cap positioned on the neck which defines the valve seat.

Referring to the embodiment shown in FIGS. 1 through 3 of the drawing, 1 represents a container or can which contains the aerosol product with the pressurized propellant gas. The aerosol valve is positioned in the neck portion 2 of the container. The valve consists of a hollow valve body preferably formed of a flexible synthetic resin such as a polyamide, polyethylene or the like and having a lower section designated 3, and an upper section, designated 4. The lower section has a cylindrical portion 3a and a conically narrowing portion 3b. The upper portion has a cylindrical wall portion 4a and an elongated cylindrical, slightly tapering neck 4b which defines, at its upper end, the conical valve seat. The neck portion 4b is connected to the cylindrical wall portion 4a by means of a resilient upper wall portion 8 which forms a diaphragm.

The lower portion of the section 3 has a cylindrical tubular extension 15 to which the hose or dip tube 16 is connected. A passage 9, communicates the interior of the hollow body 3–4 with the interior of the connection 15. A stationary valve stem 5 is connected to the bottom portion 14 of the section 3 and extends upwardly through the hollow interior of the body and through the neck 4b. Positioned at the end of the valve stem 5 is the conical valve body 6 which is in sealing engagement with the valve seat defined at the end of the neck portion 4b. The hollow body 3–4 is firmly seated in sealing engagement with the container neck 2 with the lower conical portion 3b and cylindrical portion 3a of the body 3 pressed in contact with the neck and with the upper end of the neck flanged over the hollow body at 1b. Additionally, a metal cap 17 may be provided to hold the body in place and reinforce the neck portion of the container.

In operation, pressure in the interior of the container 1 is communicated through the interior of the dip tube 16, connection 15 and the passage 9 to the interior of the hollow body 3–4. This pressure acts on the diaphragm 8 forcing the same and the neck 4b upward so that the valve seat at the end of the neck is firmly pressed in sealing contact with the conical valve body 6.

When it is desired to open the valve to discharge and spray the contents from the container, the top of the cap 7 is pressed, as for example, with a finger, forcing the neck portion 4b downwardly with an inward flexing of the diaphragm 8 against the pressure in the interior of the hollow body 3–4. The forcing downwardly of the neck portion 4b moves the valve seat at the end thereof away from the conical valve body 6 so that the valve is opened and contents of the aerosol container by means of the pressure of the propellant will be forced up through the dip tube 16, the interior of the connection 15, the interior of the hollow body 3–4, the neck 4b, past the valve seat through the hollow passageway 11, the nozzle 13 and same is sprayed through the discharge opening 12. The downward movement of the neck 4b and valve seat at the end thereof, is limited by the projection 10 coming in contact with the top of the conical valve body 6 as is shown in FIG. 3 which depicts the valve in the open position.

As soon as the pressure on the cap 7 is relieved, propellant pressure on the diaphragm 8 will immediately again force the valve to the closed position as shown in FIGS. 1 and 2.

The diaphragm 8 can be increased in size as desired so that the closure pressure acting on the valve through the diaphragm 8 may be made as large as desired without the necessity of a spring. In special cases, however, a spring may also be employed, being positioned, for example, between the diaphragm and the bottom 14 of the body portion 3.

The valve, i.e., the conical valve body 6 and the engaging valve seat, is positioned close to the nozzle 13 and outlet opening 12 and the passage 11 which is annularly shaped due to the projection 10, provides an eddying of the flow stream emerging therethrough, so that excellent atomization may be obtained at the outlet opening 12.

The embodiment as shown in FIG. 4 is identical in construction and operation except in the manner in which the body 4 is secured to the neck of the container.

As shown, the portion 4 of the hollow body may be provided with an annular flange 18 and cylindrical collar 19. The outer surface of the cylindrical collar 19 is pressed in sealing engagement with the inner surface of the cylindrical neck of the aerosol container and the flange 18 and collar 19 may be provided with a rigid closure piece 21 which fits in an annular recess 20 in the section 4 of the hollow body. The upper end of the collar 19 and closure piece 21 may be clinched in place at 19a as shown in the left hand part of FIG. 4 or flanged in place as shown at b in the right hand part of FIG. 4. The closure part 21 should be rigid enough and secured in place so that the pressure in the container does not cause movement of the same or the hollow valve body and only acts upon the diaphragm.

The construction, in accordance with the invention, provides a great savings in manufacturing costs, the manufacturing costs being only about one-tenth to one-fifth of the manufacturing costs of the conventional aerosol valve. Furthermore, the construction allows a better spray effect to be obtained and in eliminating the need for the spring, not only is the cost thereof avoided, but failure caused by corrosion of the spring by the aerosol product is eliminated. By suitable adjustment of the diaphragm 8 without the use of the spring, it is possible to make the valve closure pressure as large as desired.

While the invention has been described in detail with reference to the specific embodiments shown, various changes and modifications become apparent to the skilled artisan which fall within the spirit of the invention and scope of the appended claims.

We claim:

[1. An aerosol valve comprising a hollow body having a resilient wall portion defining a diaphragm, a valve seat connected to said diaphragm for movement therewith and defining an outlet passage from the interior of said hollow body, a stationary valve stem extending through the interior of said body and outlet passage, a valve body on said valve stem positioned for sealing engagement with said valve seat said valve stem being fixed to said hollow-body, an inlet passage to the interior of said hollowed body for flow and pressure communication with the interior of the container in connection with which the valve is used, and means for moving said valve seat out of sealing engagement with said valve body against fluid pressure in the interior of said hollow body.]

[2. Aerosol valve according to claim 1, in which said last mentioned means is means for manually depressing said valve seat.]

[3. Aerosol valve, according to claim 2, in which said valve seat is defined on a neck, forming an extension of said body and in which said last mentioned means includes a cap positioned on said neck whereby depression of said cap operates said valve.]

[4. Aerosol valve according to claim 3, in which said cap defines a passage in communication with said valve seat terminating as a spray nozzle.]

[5. Aerosol valve according to claim 4, in which said cap defines a projection in said passage positioned for engagement with said valve body to limit movement of said valve seat.]

[6. Aerosol valve according to claim 1, in which said valve body is a conical valve body, narrowing in the direction toward the interior of said hollow body and in which said valve seat is a conical valve seat widening in the direction away from the interior of said hollow body.]

[7. Aerosol valve according to claim 1, in which said hollow body has a substantially cylindrical wall portion.]

[8. Aerosol valve according to claim 7, in which said cylindrical wall portion narrows conically at its lower portion, and including an aerosol cylinder having a neck portion in sealing engagement with said cylindrical and conical portion of asid hollow body.]

[9. Aerosol valve according to claim 1, in which said hollow valve body is provided with an annular flange and a substantially cylindrical collar.]

[10. Aerosol valve according to claim 9, including a substantially rigid closure cap fitting said annular flange and cylindrical collar and adapted to be bent at its free end in engagement with the edge of a neck of an aerosol container.]

[11. Aerosol valve according to claim 10 in which a hollow body has an outer wall portion and in which said substantially rigid cap fits in an annular recess defined in said outer wall.]

12. An aerosol valve comprising a hollow valve body defining a lower and upper section, said upper section defining a cylindrical wall portion and an elongated [tapering] neck portion [said portion defining at its upper] *extending outwardly from said upper section, said neck portion having at its outer* end a [conical] valve seat, the said neck and cylindrical wall portion being connected by a resilient wall portion defining a diaphragm, a stationary valve stem extending through the interior of said body *and said neck portion,* a valve body on said valve stem positioned for sealing engagement with said valve seat, said valve stem being fixed to said hollow body, *an* inlet passage to the interior of said hollow body in flow and pressure communication with the interior of the container in connection with which the valve is used, and means for moving said valve *seat* out of sealing engagement with said valve body against fluid pressure in the interior of said hollow body.

[13. An aerosol valve comprising a fixed stationary valve body, a valve seat defining an outlet passage for the contents of an aerosol container to which the valve is attached, said valve seat being positioned in sealing engagement with said valve body and movable in relationship to said valve body for movement upon manual actuation to a position in spaced relationship to said body, and a movable diaphragm connected for movement with said valve seat, dimensioned and positioned to be acted upon by the pressure in an aerosol container to which the valve is attached to resiliently force the valve seat into sealing engagement with the valve body.]

*14. An aerosol valve for a container comprising a hollow valve body having a substantially rigid wall por-*

*tion and an opposite resilient wall portion forming a flexible diaphragm, said rigid wall portion having an inlet opening therein, said resilient wall portion having a discharge opening therein, a tubular sleeve fixed to said resilient wall portion in alignment with said discharge opening and extending outwardly from said resilient wall portion, a valve seat at the outer end of said sleeve, a valve member fixed at one end to said rigid wall portion and having a stem portion extending through said discharge opening and said sleeve, a valve plug on the outer end of said stem engageable with said valve seat and a hollow cap having a discharge passage therein and a discharge orifice in a side thereof mounted directly on and receiving telescopically a portion of said sleeve to dispose said valve seat adjacent to said orifice, said cap being manually movable to displace said sleeve endwise and disengage said seat from said plug.*

*15. Aerosol valve according to claim 14 in which said cap defines a projection in said passage positioned for engagement with said valve plug to limit movement of said valve seat.*

References Cited by the Examiner

The following references, cited by the Examiner, are of record in the patented file of this patent or the original patent.

UNITED STATES PATENTS

| | | | |
|---|---|---|---|
| 1,669,568 | 5/28 | McGee | 251—342 |
| 2,127,892 | 8/38 | Stewart | 251—342 |
| 2,364,307 | 12/44 | Mossett | 222—521 |
| 2,376,383 | 5/45 | Richards | 251—342 |
| 2,610,940 | 9/52 | Endicott | 222—394 |
| 2,835,418 | 5/58 | Manetti | 222—394 |
| 2,883,090 | 4/59 | Remane | 222—394 |
| 2,965,271 | 12/60 | Soffer et al. | 222—394 |

FOREIGN PATENTS

| | | |
|---|---|---|
| 628,167 | 3/36 | Germany. |

M. HENSON, WOOD, Jr., *Primary Examiner.*

EVERETT W. KIRBY, *Examiner.*